United States Patent
Slaight

(10) Patent No.: US 7,616,635 B2
(45) Date of Patent: Nov. 10, 2009

(54) ADDRESS MAPPING FOR DATA PACKET ROUTING

(75) Inventor: Thomas M. Slaight, Beaverton, OR (US)

(73) Assignee: Intel Corporation, Santa Clara, CO (US)

( * ) Notice: Subject to any disclaimer, the term of this patent is extended or adjusted under 35 U.S.C. 154(b) by 444 days.

(21) Appl. No.: 11/540,347

(22) Filed: Sep. 29, 2006

(65) Prior Publication Data
US 2008/0080496 A1 Apr. 3, 2008

(51) Int. Cl.
*H04L 12/28* (2006.01)
(52) U.S. Cl. .................... 370/390; 370/392
(58) Field of Classification Search ............ None
See application file for complete search history.

(56) References Cited

U.S. PATENT DOCUMENTS

| | | |
|---|---|---|
| 6,779,118 B1 | 8/2004 | Ikudome et al. |
| 7,016,352 B1 | 3/2006 | Chow et al. |
| 7,047,313 B1 | 5/2006 | Broerman |
| 2005/0172025 A1* | 8/2005 | Colas et al. ............ 709/226 |
| 2006/0187928 A1* | 8/2006 | McGee et al. .......... 370/390 |
| 2006/0251085 A1* | 11/2006 | Kalkunte et al. ....... 370/400 |
| 2007/0002826 A1* | 1/2007 | Bennett et al. ......... 370/351 |
| 2008/0215754 A1 | 9/2008 | Belimpasakis et al. |

OTHER PUBLICATIONS

The NETBSD Developers, "Chapter 27. Introduction to the Common Address Redundancy Protocol (CARP), Part IV. Networking and related issues", Downloaded from http://www.netbsd.org/docs/guide/en/chap-carp.html, The NetBSD Guide—, (Feb. 19, 2008), 1-7.

* cited by examiner

*Primary Examiner*—Hong Cho
*Assistant Examiner*—Eunsook Choi
(74) *Attorney, Agent, or Firm*—Blakely, Sokoloff, Taylor & Zafman LLP

(57) ABSTRACT

A method and apparatus for address mapping for data packet routing. An embodiment of a network controller includes an address filter, where the address filter is to receive a data packet that has a shared address for a plurality of devices as a destination. The network controller also includes a sideband filter to identify an intended recipient device for the packet based on information contained in the packet, and an address mapper to substitute an address for the intended recipient device in place of the shared address of the data packet.

15 Claims, 5 Drawing Sheets

ADDRESS MAPPING FOR DATA PACKET ROUTING

FIELD

Embodiments of the invention relate to computer controllers. More particularly, embodiments of the invention relate to address mapping for data packet routing.

BACKGROUND

In the operation of computer systems, particularly systems such as servers and desktop computers, a network controller may be utilized to route traffic to devices, including a management controller. The system may include the operation of an Ethernet connection. In a common operation, the management controller's MAC (Media Access Control) address is used as the MAC address on the network, and this address thus will be used to direct traffic to the management controller via the network controller.

However, the conventional use of the MAC address may limit the operations possible for a network controller by limiting how management controllers may be addressed, particularly when the network connection is shared by more than one management controller, and when the network connection is shared between the management controllers and the host computer system. In protocols such as DHCP (Dynamic Host Configuration Protocol), the IP (Internet Protocol) address of a device is associated with the MAC address for the device, which thus implies that supporting multiple MAC addresses will also require multiple supporting IP addresses. In a modern IPv4 (Internet Protocol version 4) computer environment, IP addresses can be a scarce commodity, particularly in large corporations and other organizations, and thus the support of multiple MAC addresses would consume additional IP addresses from this scarce resource. It is common for management controllers to incorporate their own built-in Ethernet network controller MAC logic. A management controller is not capable of being directly connected to a network and addressed individually without having its own MAC address, and consequently individually accessing management controllers with IP will require each management controller to have at least one unique IP address.

In addition, the distribution and assignment of IP addresses may require significant effort on the part of customers. Customers often have a strong desire to minimize the difficulty in assignment and management of fixed IP addresses, and thus would prefer to limit the number of fixed IP addresses that are required. However, dynamic IP addresses may not provide a viable option because it is often desirable to utilize fixed IP address assignments for important systems such as servers.

It is common practice in network installations to partition IPv4 networks into subnets to facilitate IP packet routing. Within the subnet, devices share a common fixed upper portion of their IP address while their unique IP address is assigned from a combination of the fixed portion and a variable portion of the address. The size of the fixed and variable portion of the address is described by a value called the subnet mask. In a typical implementation, the subnet mask indicates the variable portion of the IP address is 8 bits. This limits the ability to assign IP addresses to systems on the subnet to at most 256 unique addresses. In an existing installation the subnet may already have more than half that number of systems present on the subnet, each consuming one IP address. If the system is replaced with a system that requires two IP addresses, the subnet would not have the capacity for supporting the required number of addresses, and thus the installation would need to either move systems to other subnets or change the subnet mask size. In turn, this would typically require rewiring or reconfiguring the network.

Thus, if a system that only requires a single IP address is to be replaced by a system that requires multiple IP addresses, the ability to introduce the system can be limited by the addressing capacity of the existing subnet. This situation may be aggravated when multiple management controllers, each having its own MAC address, must be accessed.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figure 1:
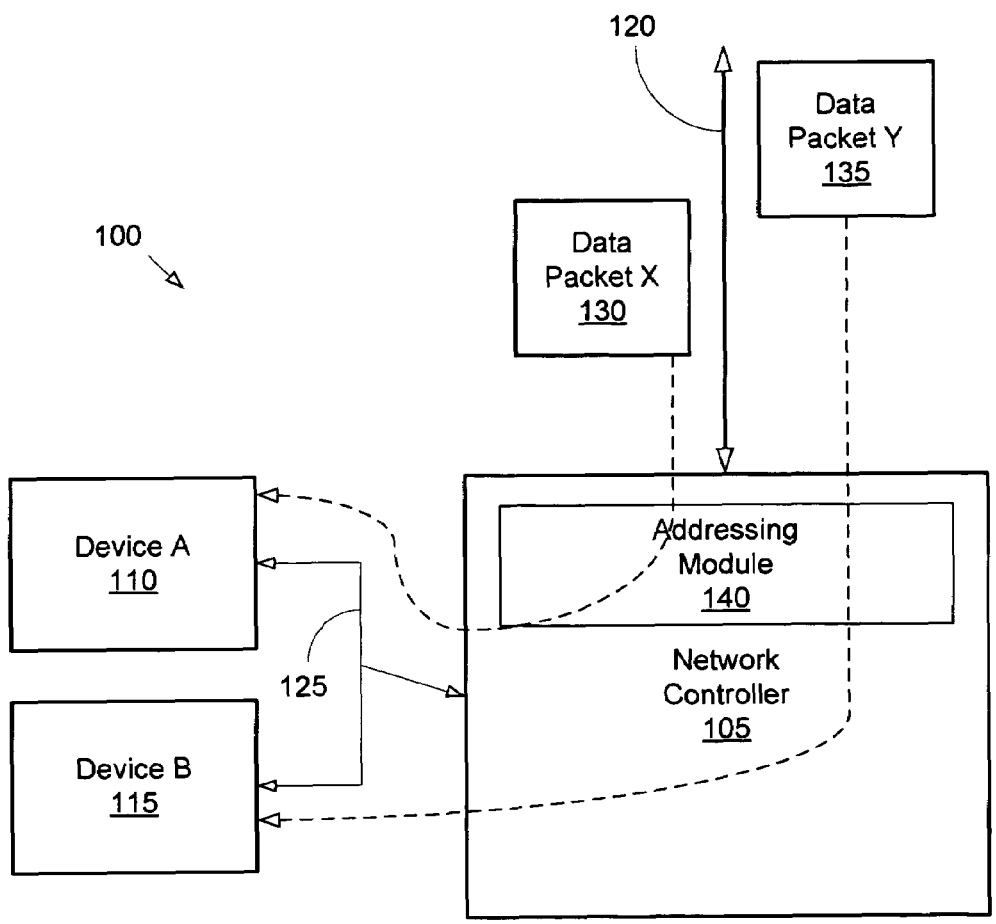
FIG. 1 is an illustration of the routing of data packets by a network controller.

An embodiment of the invention concerns address mapping for data packet routing.

As used herein:

"Network controller" means a device to provide an interface for a management controller, computer system, or other element through which data packets may be delivered to and from a network. A network controller may provide electrical and signaling logic for interfacing with a network medium, and provide timing and encoding functions for packet framing data transfers with the network medium at the physical and datalink layers.

"Management controller" means an agent, including a microcontroller or processor, with functions that include aggregation of management parameters. The management parameters may be obtained from one or more managed entities. A management controller may provide access to such parameters for local or remote software or other management controllers. Functions of a management controller may further include interpreting and processing management related data, and initiating management related actions on managed entities.

"Management parameter" means a datum representing a characteristic, capability, status, or control point associated with a managed entity. Examples of management parameters may include, but are not limited to, temperature, speed, voltage, on or off state, link state, uncorrectable error count, and device power state.

"Managed entity" means a physical or logical entity that is managed, with management including monitoring or controlling, via management parameters. Examples of managed physical entities may include, but are not limited to, fans, processors, power supplies, circuit cards, and system chassis. Examples of managed logical entities may include, but are not limited to, virtual processors, cooling domains, and system security states.

"MAC address", or "media access control address" means a unique identifier attached to networking equipment. MAC addresses include protocols that use one of three numbering spaces managed by the IEEE, such spaces being MAC-48, EUI-48, and EUI-64.

"Ethernet" refers to a local area network or to a group of standards defining local area networks. The standards cover such elements as cabling and the structure of data sent over those cables, as well as the hardware that connects the cables. With regard to Ethernet, "PHY" means an Ethernet physical layer device and "MAC" means a media access control device. The PHY and MAC may be combined in a single physical device.

In an embodiment of the invention, a network controller is responsible for directing data packets to multiple devices. In an embodiment, a data packet intended for one of the multiple devices is directed to the correct recipient device based on one or more fields of the data packet. In an embodiment, a received data packet intended for a device contains a shared MAC address as a destination MAC address, the shared MAC address being used for each of the multiple devices. The controller determines the intended recipient of the packet, identifies the destination address for the data packet, and substitutes for the destination MAC address for the shared MAC address in the data packet.

In a particular example, a network controller routes data packets to multiple management controllers over a sideband interface. In an embodiment of the invention, any data packet intended for one of the multiple management controllers is addressed to single shared MAC address that is used to route the packets to the network controller. Upon receipt of a packet, the network controller determines the intended recipient of the packet, and substitutes the MAC address of the intended recipient for the shared MAC address contained in the packet.

In an embodiment of the invention, delivery of data packets using MAC address sharing is provided for management controllers, with the delivery process being provided consistent with the appropriate packet protocol. For example, in the delivery of Ethernet data frames to management controllers, each management controller has its own MAC address, and the Ethernet protocol is constrained to only accept Ethernet frames that conform to the Ethernet frame format specification. In an embodiment of the invention, a mapping process for data packets allows delivery of data packets without extending the packet format or altering any of the data payload content of the Ethernet frame.

A data packet will commonly contain a checksum or error word for use in detecting errors in the data packet. In a particular example, the value may be a CRC (cyclic redundancy check). However, the substitution of the address would generally cause the data packet to result in an error because the CRC would no longer match the data contained in the packet. In an embodiment of the invention, a controller further recalculates the CRC for a data packet after the MAC address for the recipient device is substituted for the shared MAC address, and substitutes the recalculated CRC for the original CRC value in the packet. In a particular example, a network controller receives a data packet intended for a first management controller. The network controller substitutes the MAC address of the first management controller into the data packet, then generates a new CRC value for the data packet, substitutes the new CRC for the original CRC, and forwards the data packet on to the intended management controller. The replacement of the CRC is allowable under the protocol because the CRC is not part of the data payload of the packet.

In an embodiment of the invention, logic is added to the sideband filtering capabilities of a network controller to enable the network controller to route a packet from a shared MAC address on a network to two or more management controller MAC addresses on a sideband interface. In an example, an incoming management packet may be addressed to a particular shared MAC address, the address being the MAC address of a platform management subsystem on the network. In an embodiment, the MAC address filter of the network controller accepts packets addressed to this MAC address, and forwards them to sideband filters to filter out the intended destination.

In an embodiment, the operations of sideband filters of the network controller include routing a packet based on certain data or data fields in the packet, such as an IP address or a port number contained in the packet. The sideband filters then use this information to determine which of the management controllers is the intended recipient of the packet.

In an embodiment of the invention, a MAC address mapper performs two functions with regard to the arriving packets. First, the MAC address mapper substitutes the MAC address of the intended management controller as the destination in place of the original shared MAC address. In addition, the MAC address mapper recalculates the CRC for the packet and inserts the recalculated CRC in the packet as a substitute for the original CRC in the received packet. The packet may then be placed on the sideband interface for the network controller for delivery to the sideband bus.

In an embodiment of the invention, the process may be reversed for outgoing packets. In such an embodiment, a management controller would insert the MAC address for the management controller into a packet as the source address for the packet, and such source MAC address be replaced with a shared MAC address, such as the MAC address for platform management subsystem on the network. In an alternative embodiment, a management controller uses the shared MAC address as the source address in a data packet, rather than the MAC address for the management controller, and thus there is no need to modify the source MAC address to insert the shared MAC address before sending the packet.

In an embodiment of the invention, the operation of a network controller to support routing to multiple management controllers may be used to reduce the number of fixed IP addresses that need to be established. In an embodiment, accesses to the management controllers in a system may be consolidated to a single, shared IP address. In a protocol that requires the association of each MAC address with a separate IP address, the use of a single MAC address enables the sharing of a single IP address. In addition, the management subsystem may potentially share the same MAC address and IP address as the host.

In an embodiment of the invention, a system operates under an Ethernet protocol. An Ethernet standard specifically allows for more than one PHY device in a system. However, in an embodiment, a system will include more than one MAC per PHY device, with each received data packet being directed to one of the MAC devices after processing of the packet.

In an embodiment of the invention, data packets received may be Ethernet frames, where the basic unit of data transmission on an Ethernet network is a frame. The Ethernet frame defines the data layout at the OSI (Open Systems Interconnection) model layer 2, the link level. The format of an Ethernet frame varies in different protocols. In one possible example, the format of an 802.3 Ethernet frame consists of these components:

(1) A preamble having 56 bits of alternating 0s and 1s, where the preamble provides nodes on a network with a signal synchronization.

(2) A start frame delimiter to mark the start of a frame, with start frame delimiter being 8 bits long with the pattern 10101011.

(3) A destination, which is the MAC address of the network node to which the frame is addressed (the intended recipient).

(4) A source, which is the MAC address of a transmitting node.

(5) A length/type field that is two octets long.

(6) Data, which is the information being sent across the network. In the example protocol, the minimum length of the field is 46 octets and the maximum length is 1500. If the data field is less than 46 octets long, then a Pad (which may be referred to as a pseudofield) is used.

(7) Pad, which is used to lengthen the data field to the minimum size of 46 octets. The pad is normally filled with a zero-octet pattern.

(8) A Frame Check Sequence field four octets long, which in this protocol is a CRC value. An Ethernet frame in such protocol will specifically utilize CRC-32 (Cyclic Redundancy Check-32-bits) to identify errors in a frame value.

FIG. 1 is an illustration of the routing of data packets by a network controller. In this embodiment, a network controller 105 is responsible for directing data packets from a network 120 to multiple devices, the devices being illustrated as device A 110 and device B 115. Device A 110 and device B 115 may be coupled via what may be referred to as a sideband bus 125. For example, the intended recipient of data packet X 130 is device A 110, and the intended recipient of data packet Y 135 is device B 115.

In an embodiment of the invention, the network controller 105 receives the data packets, where each of the data packets includes a shared MAC address. In an embodiment, the network controller includes an addressing module 140 to handle received data packets. In an embodiment, the addressing module 140 determines the identify of the intended recipient from a received data packet and modifies the MAC address of the packet to provide the packet to the correct device. For example, network controller 105 receives data packet X 130. The addressing module 140 determines the correct recipient of the packet from a field of the packet. For example, the packet may include a port number that can be used to map the correct MAC address of the recipient device to the packet. The addressing module 140 then replaces the MAC address of the packet with the MAC address of the recipient. In addition, because an error word, such as a CRC value, within the data packet 130 will no longer reflect the data packet after the MAC address has been changed, the error word is recalculated and the addressing module 140 replaces the original error word with the recalculated error word, and then forwards on the modified data packet X 130 for receipt by Device A 110.

Figure 2:
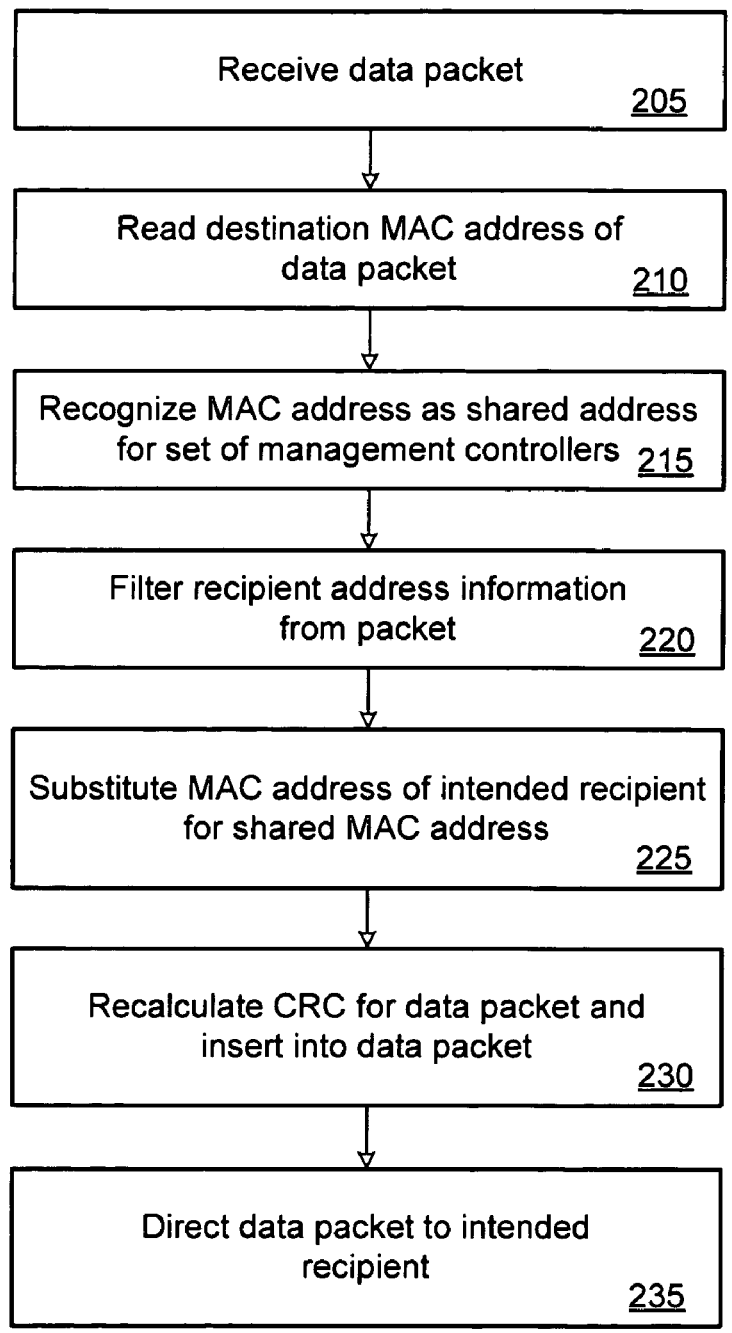
FIG. 2 is a flowchart to illustrate an embodiment of a process for routing a data packet to a device.

FIG. 2 is a flowchart to illustrate an embodiment of a process for routing a data packet to a device. The chart is provided for illustration, and does not demonstrate all of the possible process that may be invoked to handle a received data packet. In the illustrated process, a data packet is received by a network controller 205. The data packet may include, but it not limited to, an Ethernet frame. The destination MAC address of the data packet is read 210, and the MAC address is recognized as a shared MAC address for a set of management controllers 215. In an example, the MAC address may reflect the address of a platform management subsystem on the network. However, the MAC address does not indicate which of the management controllers is the intended recipient of the packet.

In an embodiment of the invention, the MAC address the intended recipient of the data packet is filtered from the data in the data packet 220. For example, such destination may be determined from certain data present in the data packet, with such data possibly including a port number or other information. In an embodiment, the MAC address of the intended recipient is substituted for the destination MAC address in the original packet 225.

The data packet may include a checksum or other error word, which may specifically be a CRC value. However, the CRC value of the data packet reflects the original MAC address, and no longer reflects the packet contents once the MAC address originally present in the packet is substituted with the MAC address of the intended recipient. In an embodiment of the invention, a new CRC is calculated for the frame after the MAC address is substituted, and the new CRC is substituted for the original CRC value 230. The modified data packet can then be directed to the intended recipient of the packet 235.

Figure 3:
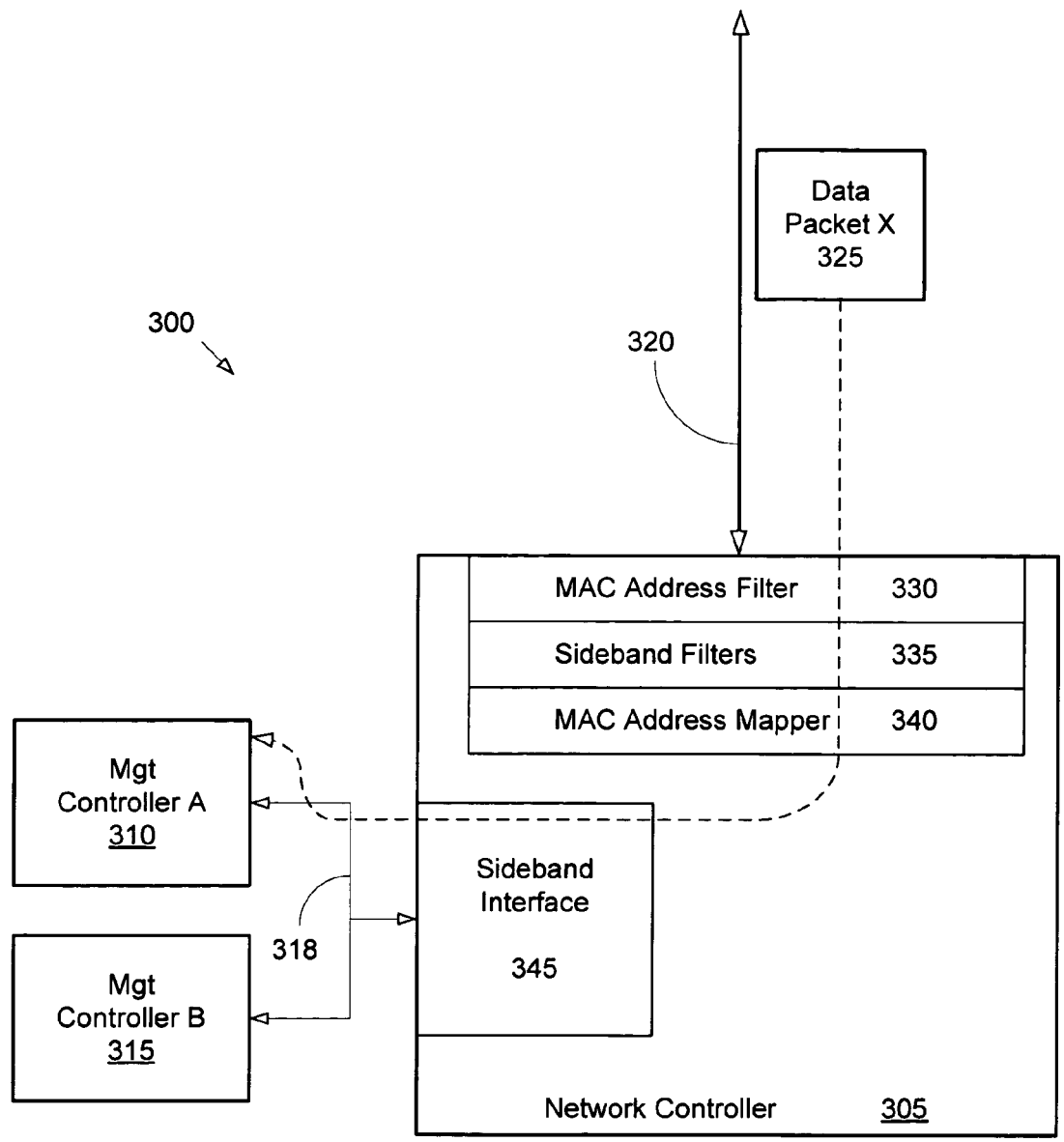
FIG. 3 is an illustration of an embodiment of a network controller operating with multiple management controllers.

FIG. 3 is an illustration of an embodiment of a network controller operating with multiple management controllers. In an embodiment of the invention, a system 300 includes a network controller 305 that handles data packets received from a network 320 that are intended for various agents, including multiple management controllers, illustrated as management controller A 310 and management controller B 315. For example, a data packet X 325 may be intended for management controller A 310. The management controllers are coupled with the network controller via a sideband bus 318. In an embodiment of the invention, a communication across the sideband bus may utilize RMII (Reduced Media Independent Interface) messaging, which is a standard for the connection of Ethernet physical layer transceivers (PHY) to Ethernet switches.

In an embodiment of the invention, a MAC address filter 330 of the network controller will recognize that a received message containing the shared MAC address messaged is intended for one of a group of management controllers. In an example, an incoming management packet may be addressed to a particular shared MAC address, the address being the MAC address of a platform management subsystem on the network. In an embodiment, the MAC address filter 330 of the network controller is to accept a data packet that addressed to the shared MAC address, and forwards them to sideband filters 335 to filter out the intended destination.

In an embodiment of the invention, sideband filters 335 of a network controller filter any received data packet that is addressed to a shared MAC address. In an example, the network controller include routing a packet based on certain data or data fields in the packet, such as an IP address or a port number contained in the packet. The sideband filters 335 then use this information to determine which of the management controllers is the intended recipient of the packet.

In an embodiment of the invention, a MAC address mapper 340 of the network control substitutes a MAC address of the intended recipient management controller as the destination of the packet in place of the shared MAC address. In addition, the MAC address mapper recalculates a CRC for the packet, and inserts the recalculated CRC in the packet as a substitute for the original CRC in the received packet. The packet may then be provided to the sideband interface 345 for the network controller for placement on the sideband bus 318, and then deliver to the intended recipient of the data packet.

Figure 4:
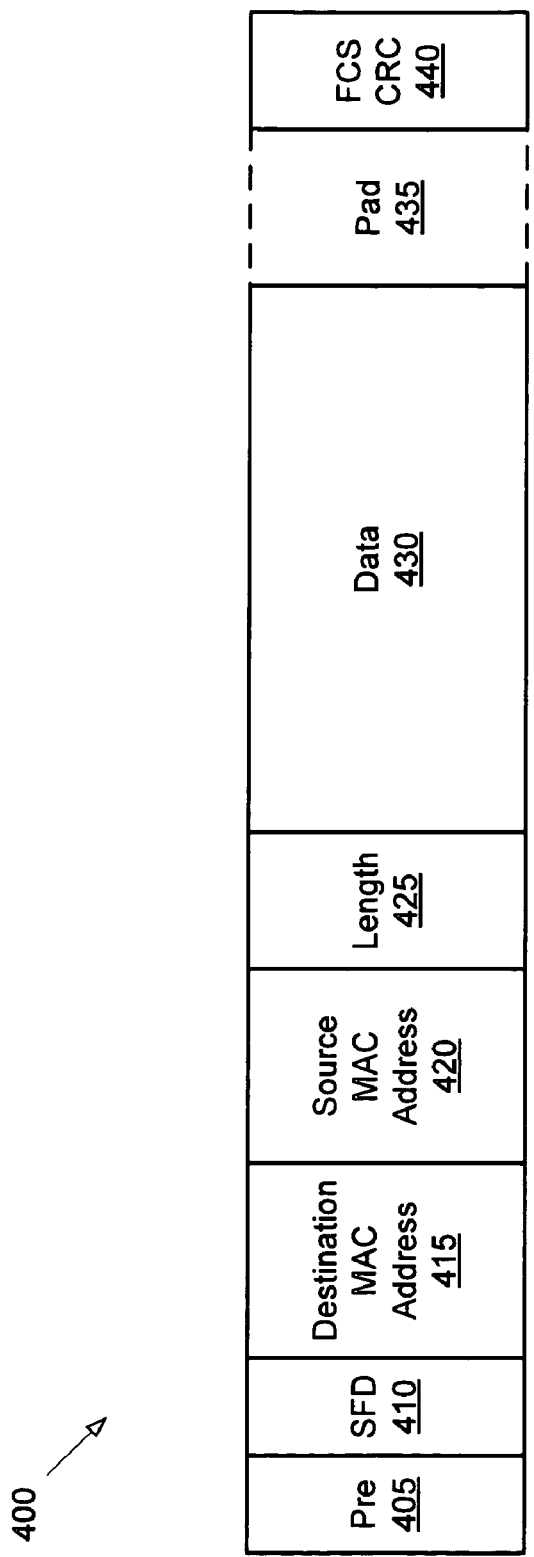
FIG. 4 is a data frame that may be utilized in an embodiment of the invention.

FIG. 4 is a data frame that may be utilized in an embodiment of the invention. The illustrated frame is only one of multiple different frames that may be used in an Ethernet system, depending on the specifics of the system. The illustrated frame is based on the IEEE (Institute of Electrical and Electronic Engineers) 802.3 Specification.

As illustrated, an Ethernet frame 400 includes a preamble 405 having 56 bits of alternating 0s and 1s, followed by start frame delimiter 410 to mark the start of a frame, the start frame delimiter being 8 bits long with the pattern 10101011. Following these fields is the destination MAC address 415. In an embodiment of the invention, the destination MAC address for any frame that is intended for one of a set of management servers will be a certain MAC address, which will result in the frame being delivered to the network server. In an embodiment, the network server will determine the intended recipient for the frame, and will map a MAC address for the recipient to the frame. In an embodiment, the MAC address 415 that is included in the frame 400 when the frame arrives is substituted for the MAC address of the intended recipient. Following the destination is the source MAC address 420, which specifies the source of the message. This is followed by a length value 425, representing the length of data in the frame, and the data of the frame 430 (the data payload). This may be following by a pad 435 to extend the data to at least the minimum field size, if necessary. The last field is a FCS (frame check sequence) field that includes a CRC or other error word 440. In an embodiment of the invention, after the destination MAC address is substituted for the MAC address of the intended recipient, the CRC would no longer be valid. For this reason, in an embodiment of the invention the CRC is recalculated based on the new values of the frame, and the recalculated CRC replaces the old CRC value.

In an embodiment of the invention, mapping of MAC addressing to allow use of a shared MAC address is provided in conformance with an Ethernet protocol, with the mapping process providing packet delivery without extending the packet format or altering any data payload content of the Ethernet frame. Specifically, an embodiment of the invention provides for delivery of packets using shared MAC addresses without modifying the preamble 405, start frame delimiter 410, source MAC address 420, length value 425, data of the frame 430, or pad 435 fields of an Ethernet frame.

Figure 5:
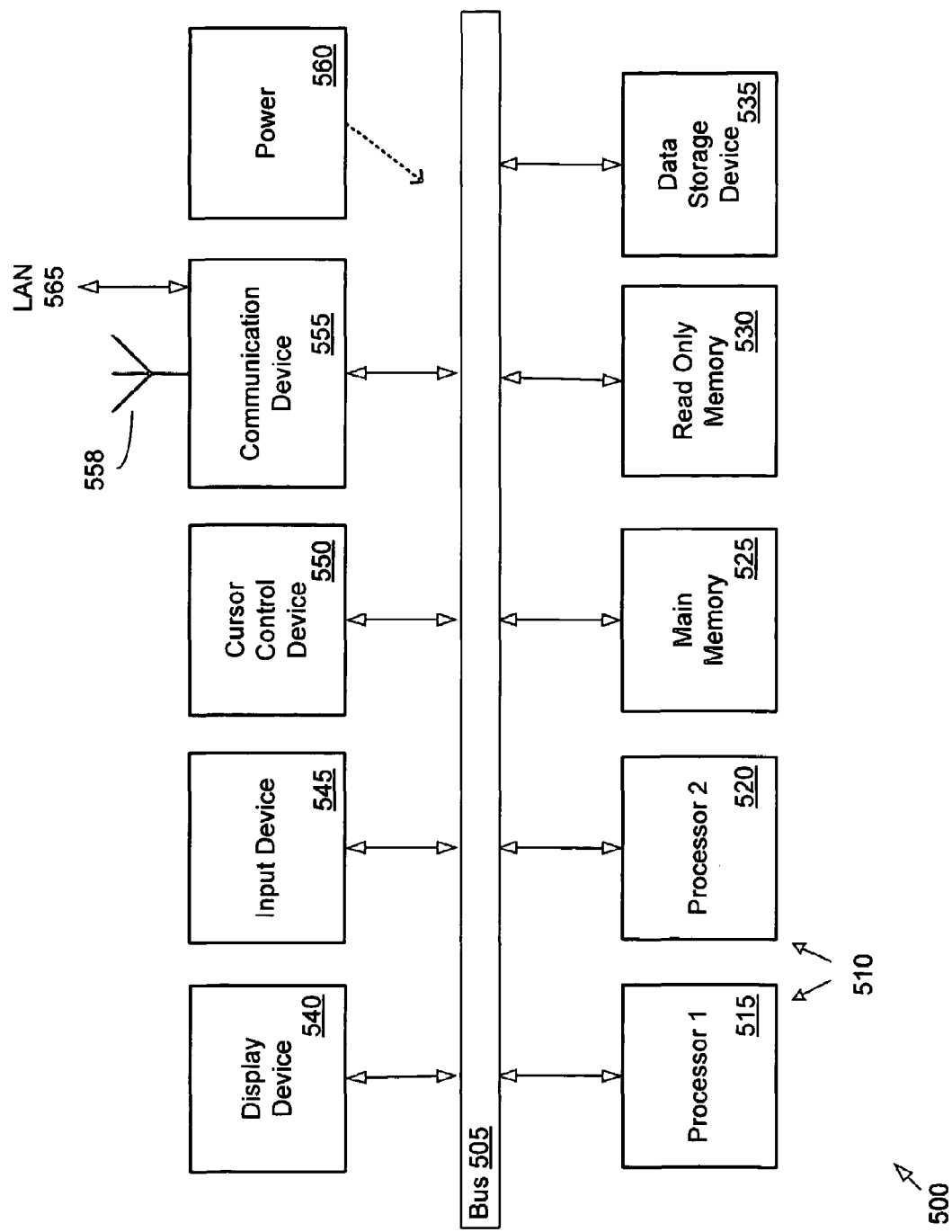
FIG. 5 is an illustration of a computer system for an embodiment of the invention.

FIG. 5 is an illustration of a computer system for an embodiment of the invention. Certain standard and well-known components that are not germane to the present invention are not shown. Under an embodiment of the invention, a computer 500 comprises a bus 505 or other communication means for communicating information, and a processing means such as two or more processors 510 (shown as a first processor 515 and a second processor 520) coupled with the bus 505 for processing information. The processors 510 may comprise one or more physical processors and one or more logical processors. Further, each of the processors 510 may include multiple processor cores. The computer 500 is illustrated with a single bus 505 for simplicity, but the computer may have multiple different buses and the component connections to such buses may vary. The bus 505 shown in FIG. 5 is an abstraction that represents any one or more separate physical buses, point-to-point connections, or both connected by appropriate bridges, adapters, or controllers. The bus 505, therefore, may include, for example, a system bus, a Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, sometimes referred to as "Firewire". ("Standard for a High Performance Serial Bus" 1394-1995, IEEE, published Aug. 30, 1996, and supplements) In an embodiment of the invention, the processors 510 may be used to analyze and identify signals received from wireless devices.

The computer 500 further comprises a random access memory (RAM) or other dynamic storage device as a main memory 525 for storing information and instructions to be executed by the processors 510. Main memory 525 also may be used for storing temporary variables or other intermediate information during execution of instructions by the processors 510. RAM memory includes dynamic random access memory (DRAM), which requires refreshing of memory contents, and static random access memory (SRAM), which does not require refreshing contents, but at increased cost. DRAM memory may include synchronous dynamic random access memory (SDRAM), which includes a clock signal to control signals, and extended data-out dynamic random access memory (EDO DRAM). The uses of the main memory may include the storage received signals from wireless devices. The computer 500 also may comprise a read only memory (ROM) 530 and/or other static storage device for storing static information and instructions for the processors 510.

A data storage device 535 may also be coupled to the bus 505 of the computer 500 for storing information and instructions. The data storage device 535 may include a magnetic disk or optical disc and its corresponding drive, flash memory or other nonvolatile memory, or other memory device. Such elements may be combined together or may be separate components, and utilize parts of other elements of the computer 500.

The computer 500 may also be coupled via the bus 505 to a display device 540, such as a cathode ray tube (CRT) display, a liquid crystal display (LCD), a plasma display, or any other display technology, for displaying information to an end user. In some environments, the display device may be a touch-screen that is also utilized as at least a part of an input device. In some environments, display device 540 may be or may include an audio device, such as a speaker for providing audio information. An input device 545 may be coupled to the bus 505 for communicating information and/or command selections to the processors 510. In various implementations, input device 545 may be a keyboard, a keypad, a touch-screen and stylus, a voice-activated system, or other input device, or combinations of such devices. Another type of user input device that may be included is a cursor control device 550, such as a mouse, a trackball, or cursor direction keys for communicating direction information and command selections to the one or more processors 510 and for controlling cursor movement on the display device 540.

A communication device 555 may also be coupled to the bus 505. Depending upon the particular implementation, the communication device 555 may include a transceiver, a wireless modem, a network interface card, LAN (Local Area Network) on motherboard, or other interface device. In an embodiment, the communication device may include a network controller, wherein the network controller is coupled with multiple management controllers over a sideband bus. In an embodiment, such elements may be as illustrated in FIG. 3. The uses of a communication device 555 may include reception of signals from wireless devices. For radio communications, the communication device 555 may include one or more antennas 558. In one embodiment, the communication device 555 may include a firewall to protect the computer 500 from improper access. The computer 500 may be linked to a network, such as LAN (local area network) 565, or to other devices using the communication device 555, which may include links to the Internet, a local area network, or another environment. The computer 500 may also comprise a power device or system 560, which may comprise a power supply, a battery, a solar cell, a fuel cell, or other system or device for providing or generating power. The power provided by the power device or system 560 may be distributed as required to elements of the computer 500.

Those skilled in the art having the benefit of this disclosure will appreciate that many other variations from the foregoing description and drawings may be made within the scope of the present invention. Indeed, the invention is not limited to the details described above. Rather, it is the following claims including any amendments thereto that define the scope of the invention.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention may include various processes. The processes of the present invention may be performed by hardware components or may be embodied in machine-executable instructions, which may be used to cause a general-purpose or special-purpose processor or logic circuits programmed with the instructions to perform the processes. Alternatively, the processes may be performed by a combination of hardware and software.

Portions of the present invention may be provided as a computer program product, which may include a computer-readable medium having stored thereon instructions, which may be used to program a computer (or other electronic devices) to perform a process according to the present invention. The machine-readable medium may include, but is not limited to, floppy diskettes, optical disks, CD-ROMs (compact disk read-only memory), and magneto-optical disks, ROMs (read-only memory), RAMs (random access memory), EPROMs (erasable programmable read-only memory), EEPROMs (electrically-erasable programmable read-only memory), magnet or optical cards, flash memory, or other type of media/computer-readable medium suitable for storing electronic instructions.

Many of the methods are described in their most basic form, but processes can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the present invention is not to be determined by the specific examples provided above but only by the claims below.

It should also be appreciated that reference throughout this specification to "one embodiment" or "an embodiment" means that a particular feature may be included in the practice of the invention. Similarly, it should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims are hereby expressly incorporated into this description, with each claim standing on its own as a separate embodiment of this invention.

What is claimed is:

1. A network controller comprising:
   an address filter, the address filter to receive a data packet, the data packet including a destination address, a data payload, and an error word for the data packet, the address filter to determine that the destination address of the data packet is a shared address for a plurality of devices;
   a sideband filter to receive the data packet from the address filter, the sideband filter to search the data payload of the data packet to identify an intended recipient device for the data packet based on information contained in the data payload of the data packet;
   an address mapper to map the information contained in the data payload to an address for the intended recipient device, the address mapper to substitute the address for the intended recipient device in place of the shared address of the data packet, calculate a new error word for the data packet including the substituted address, and to substitute the new error word in place of the error word contained in the data packet; and
   a sideband interface to direct the data packet to the intended recipient device based on the substituted address.

2. The network controller of claim 1, wherein the error word comprises a CRC (cyclic redundancy check).

3. The network controller of claim 1, wherein the address of the intended recipient device is the MAC (media access control) address for the intended recipient device.

4. The network controller of claim 1, wherein the data packet comprises an Ethernet frame.

5. A method comprising:
   receiving a data packet from a network, the data packet including a destination MAC (media access control) address, a data payload, and a first CRC (cyclic redundancy check) value for the data packet;
   reading the destination MAC address for the data packet, the destination MAC address being a shared MAC address for a plurality of management controllers;
   determining which of the plurality of management controllers is the intended recipient of the data packet, the determination being based on information contained in the data payload of the data packet;
   substituting a MAC address of the intended recipient for the shared MAC address in the data packet;
   calculating a second CRC value for the data packet including the MAC address of the intended recipient; and
   substituting the second CRC value for the first CRC value in the data packet.

6. The method of claim 5, wherein the information in the data packet includes a port number.

7. The method of claim 5, wherein the information in the data packet includes an IP (Internet Protocol) address.

8. The method of claim 5, further comprising:
   receiving a second data packet from a first management controller of the plurality of management controllers, the second data packet including a source MAC address and a third CRC value; and
   substituting the source MAC address in the second data packet with the shared MAC address for the plurality of management controllers.

9. The method of claim 8, further comprising calculating a fourth CRC value for the second data packet including the shared MAC address and substituting the fourth CRC value for the third CRC value in the second data packet.

10. A system comprising:
    a bus;
    a network controller coupled with the bus, the network controller to receive data packets from a network, each data packet including a destination MAC (media access control) address, a data payload, and a CRC (cyclic redundancy check) word for the data packet, the network controller including an addressing module to determine an intended recipient of a received data packet that includes a shared MAC address as a destination address, the network controller to determine the intended recipient by reading a data field in the data payload of the received data packet, the addressing module also to remove the shared MAC address from the received data packet and replace the shared MAC address with a MAC address for the intended recipient and to recalculate the CRC word of the received data packet after replacing the shared MAC address with the MAC address for the intended recipient;

a plurality of management controllers coupled with the network controller via a sideband bus, the management controllers to received data packets from the network controller; and a dynamic random access memory coupled with the bus, the memory including storage of data from received data packets.

11. The system of claim 10, wherein the data field includes a port number.

12. The system of claim 10, wherein the data field includes an IP (Internet Protocol) address.

13. A computer-readable medium having stored thereon data representing sequences of instructions that, when executed by a processor, cause the processor to perform operations comprising:

reading a destination MAC (media access control) address of a received data packet, the destination MAC address being a shared MAC address for a plurality of devices, the data packet further including a data payload and a first CRC (cyclic redundancy check) value;

determining which of the plurality of devices is the intended recipient of the data packet, the determination being based on information in the data payload of the data packet;

replacing the shared MAC address in the received data packet with a MAC address for the intended recipient;

calculating a second CRC value for the data packet after replacing the shared MAC address with the MAC address for the intended recipient, and replacing the first CRC value in the received data packet with the second CRC value.

14. The medium of claim 13, further comprising instructions that, when executed by the processor, cause the processor to perform operations comprising:

receiving a second data packet from a first management controller of the plurality of management controllers, the second data packet including a source MAC address and a third CRC value; and substituting the source MAC address in the second data packet with the shared MAC address for the plurality of management controllers.

15. The medium of claim 14, further comprising instructions that, when executed by the processor, cause the processor to perform operations comprising:

calculating a fourth CRC value for the second data packet including the shared MAC address and substituting the fourth CRC value for the third CRC value in the second data packet.

* * * * *